(12) United States Patent
Ichikawa et al.

(10) Patent No.: US 7,519,978 B2
(45) Date of Patent: Apr. 14, 2009

(54) MOVEMENT ADJUSTING DEVICE, METHOD THEREOF, AND CARRIER DEVICE

(75) Inventors: Yoshihiro Ichikawa, Tokorozawa (JP); Yoshitake Shimada, Tokorozawa (JP); Yusuke Akama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 706 days.

(21) Appl. No.: 11/059,312

(22) Filed: Feb. 17, 2005

(65) Prior Publication Data

US 2005/0190497 A1    Sep. 1, 2005

(30) Foreign Application Priority Data

Feb. 19, 2004    (JP)    ............... 2004-042681

(51) Int. Cl.
*G11B 15/68* (2006.01)
(52) U.S. Cl. ................................................ 720/651
(58) Field of Classification Search .................. None
See application file for complete search history.

(56) References Cited

U.S. PATENT DOCUMENTS

| 5,732,064 A | * | 3/1998 | Huang | ........................ 720/611 |
| 6,151,285 A | * | 11/2000 | Watanabe et al. | ........... 720/610 |
| 6,208,605 B1 | * | 3/2001 | Akiba | ........................ 720/613 |
| 7,020,884 B2 | * | 3/2006 | Choi et al. | .................. 720/613 |
| 7,213,252 B2 | * | 5/2007 | Ataguchi et al. | .............. 720/10 |

FOREIGN PATENT DOCUMENTS

JP    10-143958    5/1998

* cited by examiner

*Primary Examiner*—Mark Blouin
(74) *Attorney, Agent, or Firm*—Kratz, Quintos & Hanson, LLP

(57) ABSTRACT

On the inner surface of a guide rail (411) having a concave groove, which extends in the vertical direction along a motion path of a disc drive (200) moved by a mover unit (300), a biasing cam (412) having thickened swelling parts (412*a*) at both ends is so provided as to have the groove width narrowed at both the upper and lower ends. A plate spring (420) which is pressed into contact with a guide surface of the surface of the biasing cam (412) by elastic biasing force is attached integrally to the disc drive (200). At the home position where the disc drive (200) operates and at the position where the disc drive (200) is lifted up, the plate spring (420) is strongly pressed into contact by the swelling parts (412*a*), and the disc drive (200) can be prevented from being moved by impact or the like from outside during operation. While moving, the pressing force is weakened so that load applied by the mover unit (300) can be reduced.

13 Claims, 12 Drawing Sheets

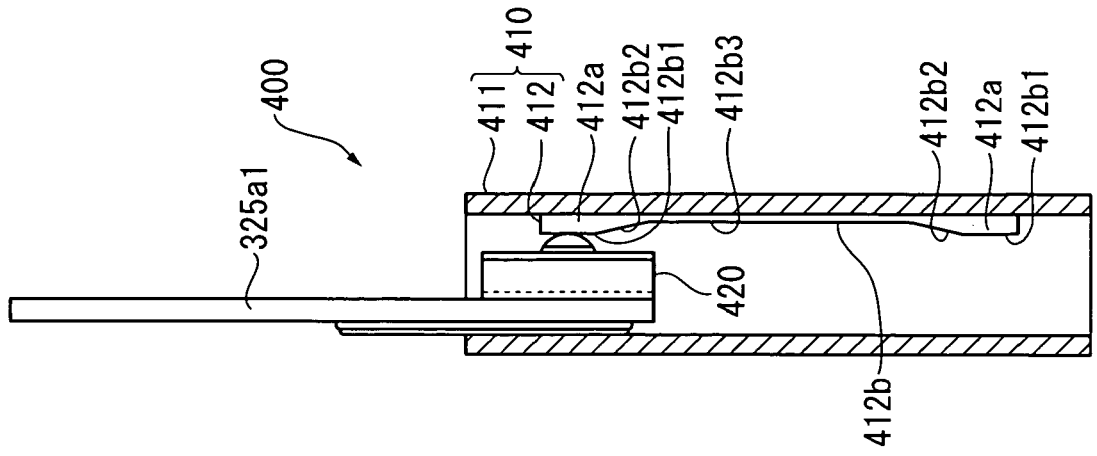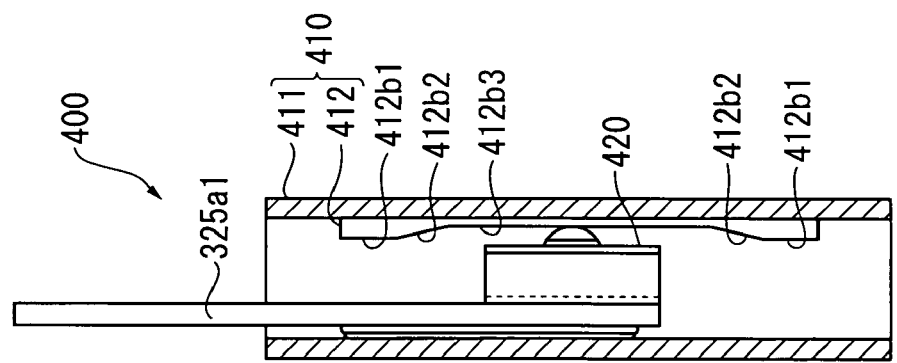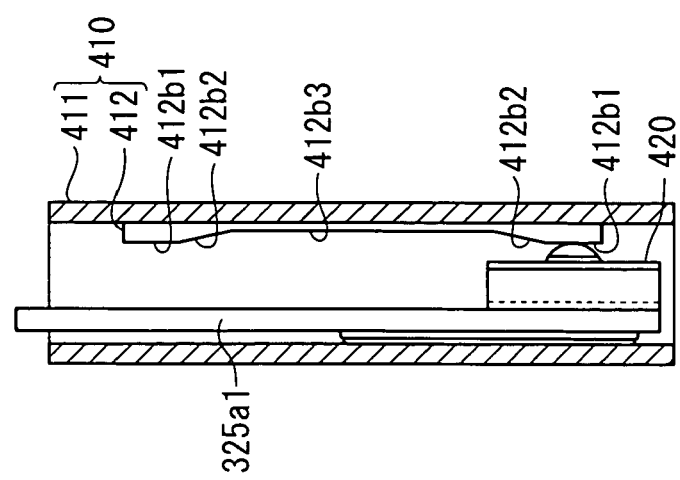

MOVEMENT ADJUSTING DEVICE, METHOD THEREOF, AND CARRIER DEVICE

BACKGROUND OF THE INVENTION

1. Field of the Invention

The present invention relates to a movement adjusting device which adjusts movement of a mobile body, carrier device, and a method thereof.

2. Description of Related Art

For example, a known conventional carrier device uses a guide rail to move a mobile body (e.g., Reference: Japanese Patent Laid-Open Publication No. Hei 10-143958, page 3, left column to page 20, left column). In the Reference, a horizontally mobile body having a cassette carrier is provided with a pair of right and left guide rollers respectively in contact with right and left position-regulation traveling surfaces of a guide rail, and a roller pressing mechanism which biases one of the guide rollers to the right and left position-regulation traveling surfaces in a pressing direction. Further, when the horizontally mobile body moves, the one guide roller is pressed to the right and left position-regulation traveling surfaces, so that the pair of guide rollers clamp the guide rail. Thus, rattling on the right and left is prevented regardless of errors of the thickness dimension of the guide rails.

In the Reference described above, for example, if the biasing force to press the guide rollers on the guide rails is increased to prevent rattling of the horizontally mobile body, the load applied to a horizontal motor which drives the horizontally mobile body increases, which causes, for example, increase in size and power consumption of the horizontal motor.

SUMMARY OF THE INVENTION

An object of the present invention is to provide a movement adjusting device, a carrier device, and a method thereof for smoothly moving a mobile body.

According to an aspect of the present invention, a movement adjusting device for adjusting movement of a mobile body which is moved between first and second positions by a mover unit includes: a guide surface along a motion path of the mobile body; a guide member which is provided on the mobile body and contacts the guide surface; and a biasing unit which biases the guide member in a direction, in which the guide member is pressed to contact the guide surface; and a variable unit which increases biasing force of the biasing unit when the mobile body is near the first and second positions.

According to another aspect of the present invention, a movement adjusting device for adjusting movement of a mobile body which is moved between first and second positions by a mover unit includes: a guide surface along a motion path of the mobile body; a guide member which is provided on the mobile body and contacts the guide surface; and a biasing unit which biases the guide member in a direction, in which the guide member is pressed to contact the guide surface; and a variable unit which shortens a distance between the guide surface and the guide member in a pressing direction thereof, when the mobile body is near the first and the second positions.

According to still another aspect of the present invention, a movement adjusting device for adjusting movement of a mobile body which is moved between first and second positions by a mover unit includes: a guide surface along a motion path of the mobile body; a guide member which is provided on the mobile body and is pressed to contact the guide surface by biasing force based on elasticity; and a variable unit which increases the biasing force of the guide member when the mobile body is near the first and second positions.

According to yet another aspect of the present invention, a movement adjusting device for adjusting movement of a mobile body which is moved between first and second positions by a mover unit includes: a guide surface along a motion path of the mobile body; and a guide member which is provided on the mobile body and is pressed to contact the guide surface by biasing force, in which the guide surface is swollen in a pressing direction thereof to contact the guide member, near the first position and the second position of the mobile body.

According to further aspect of the present invention, a carrier device includes: a mover unit which moves a mobile body between first and second positions; and a movement adjusting device of the present invention.

According to still further aspect of the present invention, in a movement adjusting method of adjusting movement of a mobile body which is moved between first and second positions by a mover unit by pressing a guide member provided on the mobile body to contact a guide surface extending along a motion path of the mobile body with biasing force, the mobile body increases the biasing force to press the guide member to contact the guide surface near the first and second positions.

BRIEF DESCRIPTION OF THE DRAWINGS

FIG. 1A shows a home position at which a disc drive is housed, FIG. 1B shows a state in which the disc drive is lifted up, and FIG. 1C shows a state in which a tray of the disc drive is unloaded;

FIG. 3A is a side view showing the home position at which the disc drive is housed and FIG. 3B is a side view showing a state in which the disc drive is lifted up;

FIGS. 4A to 4C are side views each showing a movement regulation section of the embodiment with a portion cut away therefrom, where FIG. 4A shows the disc drive at the home position, FIG. 4B shows the disc drive in moving, and FIG. 4C shows the disc drive lifted up to the uppermost position;

FIG. 11A shows a state at the home position and FIG. 11B shows a state in moving; FIG. 12A shows a state at the home position and FIG. 12B shows a state in moving.

DETAILED DESCRIPTION OF PREFERRED EMBODIMENTS

An embodiment of the present invention will now be described with reference to the drawings. The embodiment of the present invention will be described, exemplifying an information processing device which has, as a mobile body, a movable disc drive which is a processing device to record and read information on and from a disc-shaped optical disc as a recording medium. In the information processing device, recording and reading operations are controlled by the disc drive to process information appropriately. The mobile body to be moved is not limited to the processing device but any object can be a target to be moved. The movement adjusting device for adjusting movement of the mobile body according to the present invention is applicable to any structure that moves the mobile body between first and second positions, for example, like an elevator. Further, the recording medium is not limited to an optical disc but may be another disc-like recording medium such as a magnetic disc or magneto-optical disc, or any other recording medium such as a memory card or magnetic tape. Any information processing device having a processing device capable of recording or reading various information on or from any of such recording media can be considered as a target. In addition, any information can be a target, e.g., video data, image data, music data, or audio data, or further, a program, application software, software game, or the like.

[Structure of Information Processing Device]

Figure 1A:
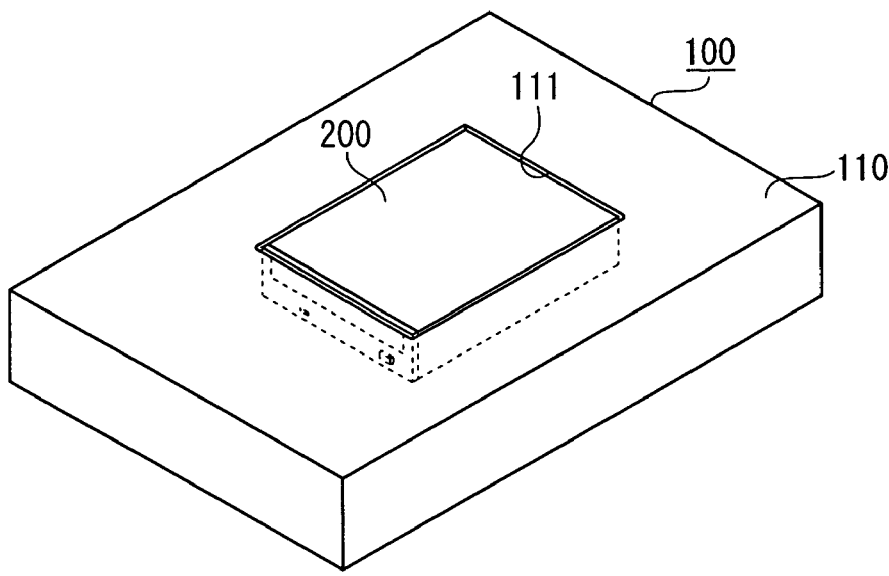
FIGS. 1A to 1C are perspective views showing an information processing device according to an embodiment of the present invention, where
Figure 1B:
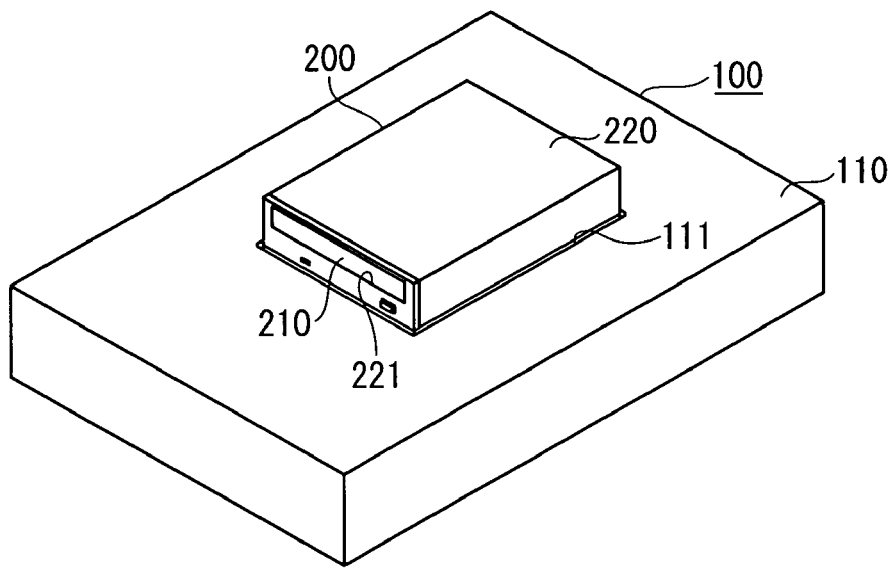
Figure 1C:
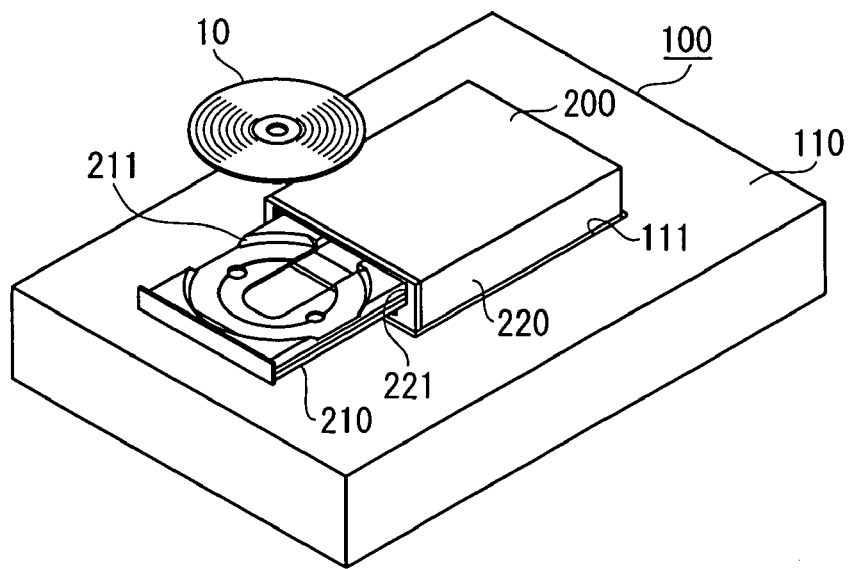
Figure 2:
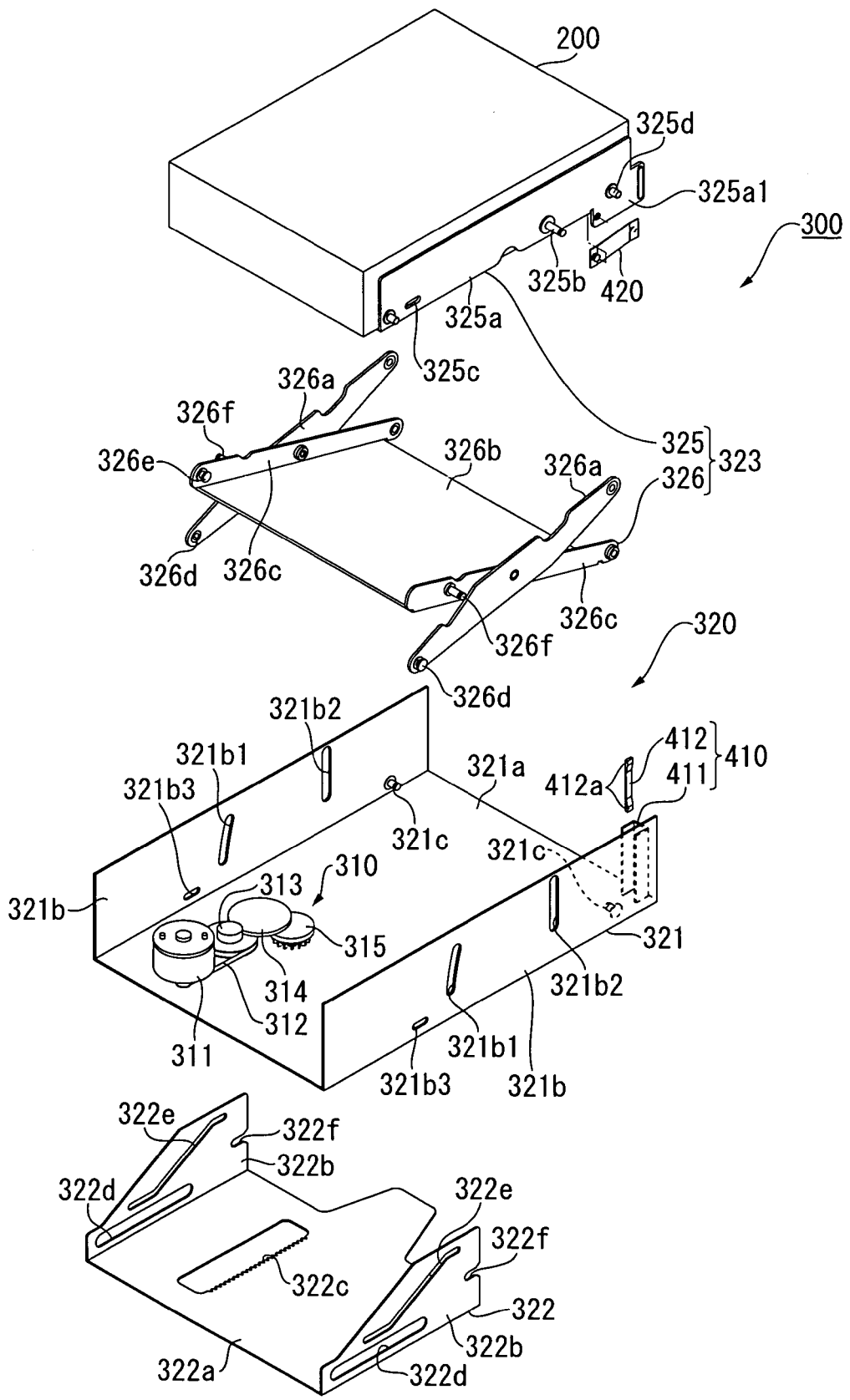
FIG. 2 is an exploded perspective view showing linking condition of a mover unit and the disc drive in the embodiment.
Figure 3A:
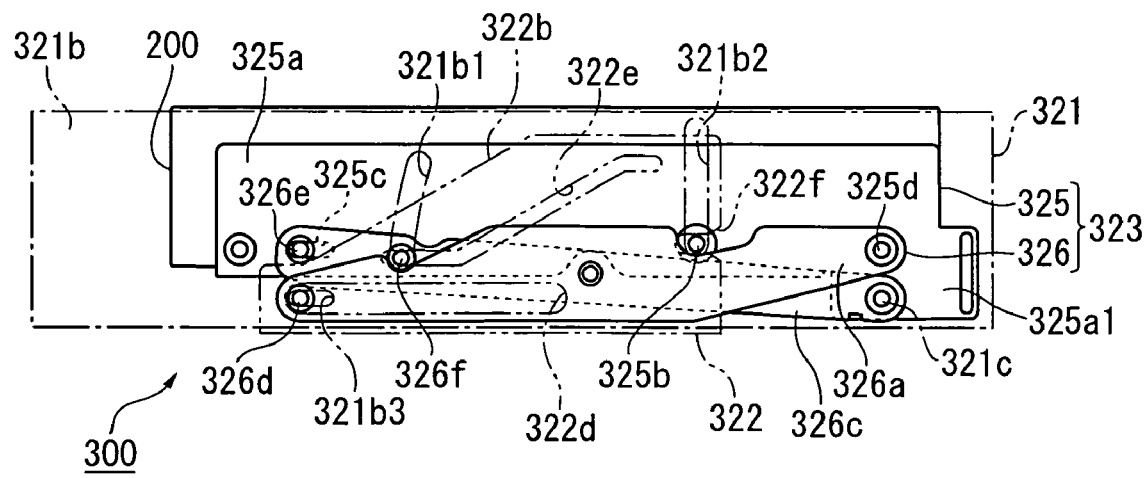
FIGS. 3A and 3B are explanatory views showing states of the disc drive lifted up and down by the mover unit in the embodiment, where
Figure 3B:
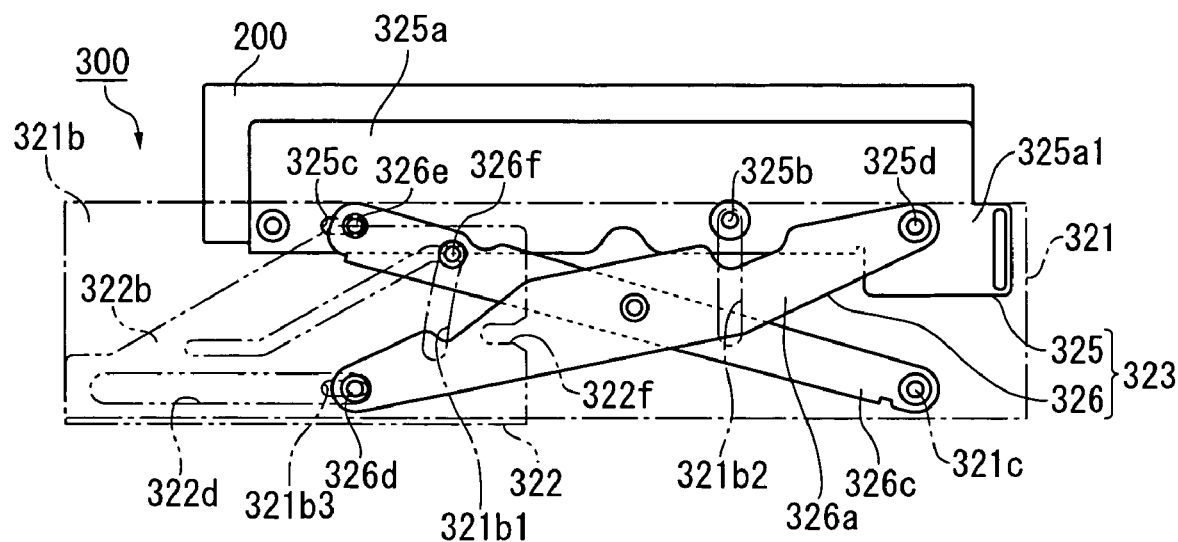
Figure 5:
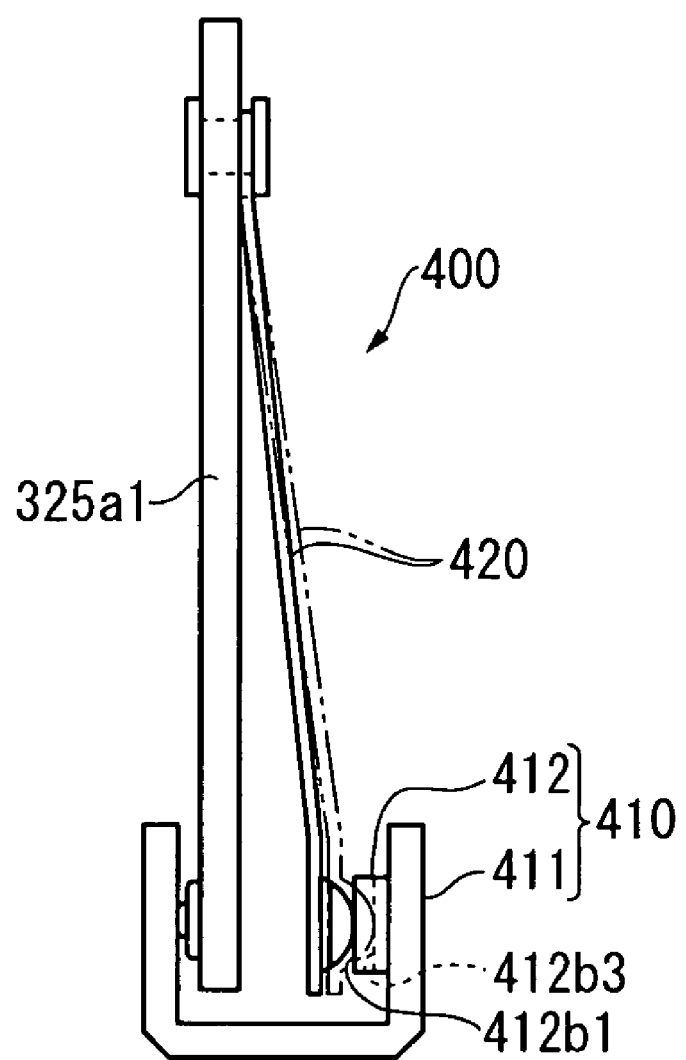
FIG. 5 is a plan view showing a movement regulation section in the embodiment with a portion cut away therefrom.

FIGS. 1A to 1C are perspective views showing the information processing device in the present embodiment. FIG. 1A is a perspective view showing a home position where a disc drive is housed. FIG. 1B is a perspective view showing a state where the disc drive is moved up. FIG. 1C is a perspective view showing a state where a tray of the disc drive is ejected. FIG. 2 is an exploded perspective view which shows linking condition of a mover unit and the disc drive. FIGS. 3A and 3B are explanatory views showing elevation of the disc drive by the mover unit. FIG. 3A is a side view showing also the home position where the disc drive is housed. FIG. 3B is a side view showing a state where the disc drive is moved up. FIGS. 4A to 4C are side views each showing a movement regulation section with a portion cut away therefrom. FIG. 4A shows a state where the disc drive is at the home position. FIG. 4B shows a state where the disc drive is in moving. FIG. 4C shows a state where the disc drive is lifted up to the uppermost position. FIG. 5 is a plan view showing the movement regulation section with a portion cut away therefrom.

In FIGS. 1A to 1C, the reference symbol 100 denotes the information processing device. This information processing device 100 obtains signals inputted from outside by performing appropriate processings, and appropriately processes and outputs obtained information. This information processing device 100 has a substantially box-like casing 110. In this casing 110, a substantially concave accommodation space not shown is sectioned and formed, with the upper surface of the space being open as an opening 111 to outside. In the accommodation space of the casing 110, a disc drive 200 is provided as a drive main body which can be moved in and out through the opening 111.

The disc drive 200 records and reads information on and from an optical disc 10 as a recording medium which is set detachable in the disc drive. Further, the disc drive 200 is provided with a disc tray 210 where the optical disc 10 is set when the disc drive is lifted up through the opening 111. The disc tray 210 can be moved out and in through an opening 221 opening in the front side of a housing 220 of the disc drive 200. This disc tray 210 is formed in a substantially plate-like shape of synthetic resins, and is provided with a mount concave part 211 having a substantially cylindrical shape on an upper surface where the optical disc 10 is set. The disc tray 210 can be moved out and in along a plane direction through the installation opening 221 of the disc drive 200. In other words, the tray is movable between the states shown in FIGS. 1B and 1C, to load and unload the optical disc 10. That is, the disc tray 210 is moved in a radial direction of the optical disc 10.

In the information processing device 100, the disc drive 200 is movable in the thickness direction of the optical disc 10 to be loaded, i.e., in vertical directions between the states shown in FIGS. 1A and 1B. In addition, a cover which fits the opening 111 of the casing 110 is attached integrally to the upper surface of the housing 220 of the disc drive 200. The opening of the information processing device 100 is closed by the cover with the disc drive 200 housed in the accommodation space.

A mover unit 300 as a carrier device which carries the disc drive 200 to move in and out through the opening 111 is provided in the casing 110, as shown in FIGS. 2, 3A, and 3B. This mover unit 300, as shown in FIG. 2, has a drive section 310, a movable section 320, a detection sensor not shown, and the like. The drive section 310 has, for example, an electric motor, a solenoid, and the like, and drives the movable section 320 to work. The movable section 320 is provided at the bottom of the accommodation space and is connected to the disc drive 200. The movable section 320 is driven by the drive section 310 to move up and down the disc drive 200. The detection sensor is provided in the movable section 320. When the disc drive 200 moves back through the opening 111, the sensor can detect a state of the disc drive 200 being housed in the accommodation space, and then output a signal indicating the disc drive 200 being in the home position.

More specifically, the drive section 310 has an electric motor 311, a pulley 313 having an endless belt 312 hung on an output shaft not shown of the electric motor 311, a gear 314 which is engaged with the pulley 313, and a drive transmission gear 315 which is engaged with the gear 314. The drive section 310 is provided integrally in the movable section 320, and makes the movable section 320 work by the pulley 313, gear 314, and drive transmission gear 315 which are rotated and driven by the electric motor 311.

The movable section 320 has a seat section 321, a cam section 322, a link mechanism section 323, and the like. The seat section 321 is formed of, for example, a steel plate or the like and has a bottom plate part 321a having a substantially plate-like shape, and a pair of side-plate parts 321b formed and bent in one uniform direction at both ends (at the opposite edges) of the bottom plate part 321a. The seat section 321 is thus formed to have a U-shaped cross section. Of this seat section, the top edges of the side plate parts 321b are arranged to be positioned near the opening of the casing 110, sectioning the accommodation space. Further, the drive section 310 is provided on the bottom plate part 321a such that the electric motor 311 is positioned in one end side and the drive transmission gear 315 protrudes from the bottom side. The detection sensor is also provided on the bottom side. First slits 321b1 and second slits 321b2 extending substantially along the vertical direction which is the bending direction are formed on the side plate parts 321b. Third slits 321b3 extending in the longitudinal direction perpendicular to the bending direction are also formed on the side plate parts 321*b*. Further, the side plate parts 321*b* are provided with shaft support pins 321*c* protruding insides along the directions in which the pins are opposed to each other.

Also, the side plate parts 321*b* are each provided with a movement regulation unit 410 where a movement regulation section 400 as a movement adjusting device is constructed, as shown in FIGS. 4A to 4C and FIG. 5. This movement regulation unit 410 has a groove-like guide rail 411 as a motion path, which is formed of, for example, a steel plate bent to have a substantially U-shaped cross section and recessed in the vertical direction in which the disc drive 200 moves, and a biasing cam 412 integrally provided on the inner surface of the guide rail 411, such that the groove-width of the guide rail 411 narrows at both of the upper and lower ends of the guide rail 411. The biasing cam 412 is formed like a thin long plate. Both ends of the cam in the lengthwise direction are thickened toward one side, and form swelling parts 412*a*. The central edges of the biasing cam 412 at the swelling parts 412*a* are formed to be thinned gradually. Further, the biasing cam 412 is integrally attached to the guide rail 411 with its lengthwise direction oriented in the vertical direction, such that the swelling parts 412*a* swell toward the inside of the guide rail 411 and the groove-width of the guide rail 411 is reduced. Alternatively, the biasing cam 412 may be formed integrally. By thus installing the biasing cam 412, the surface of the guide rail 411 in the groove-width direction, which is the surface of the biasing cam 412, serves as a guide surface 412*b*. The guide surface 412*b* is constructed by the top end surfaces of the swelling parts 412*a* where the biasing cam 412 swells, as regulation surfaces 412*b*1, the slanted parts of the swelling parts 412*a* as slope surfaces 412*b*2, and the surface of the thin part between the swelling parts 412*a* as a motion surface 412*b*3.

The cam section 322 is formed of, for example, a steel plate or the like, and has a bottom 322*a* having a substantially plate-like shape and substantially the same size as the width between the outer surfaces of the side plate parts 321*b* of the seat section 321, and a pair of side parts 322*b* formed and bent in one uniform direction at the opposite edges of the bottom 322*a* in the width direction. The cam section 322 is thus formed and bent to have a substantially U-shaped cross-section. This cam section 322 is provided overlapped over the outer surfaces of the seat section 321. Further, the bottom 322*a* is provided with a rack 322*c* which is engaged with the drive transmission gear 315 protruding from the seat section 321 of the drive section 310, so that the cam section 322 can move, relative to the seat section 321, in the longitudinal direction perpendicular to the width direction as the drive section 310 drives. The side parts 322*b* are each provided with an oblong guide slit 322*d* along the movement direction, and an operation slit 322*e* which is inclined to the vertical direction. The difference in height of the operation slit 322*e* in the vertical direction determines the distance by which the disc drive 200 moves up and down. Further, the side parts 322*b* are each provided with a positioning concave part 322*f* notched and recessed at one edge in the movement direction.

Further, the link mechanism section 323 has a shaft support member 325 and a link member 326. The shaft support member 325 is formed of, for example, a steel plate, and has a connection plate part not shown but formed like a plate having substantially the same shape as the bottom of the disc drive 200, and a pair of shaft support plate parts 325*a* bent and formed in one uniform direction, at both side edges in the width direction, which are opposite edges of the connection plate part. The shaft support member 325 is thus formed to have a U-shaped cross section. This shaft support member 325 is integrally installed by screwing, covering the bottom and both sides of the disc drive 200. Further, guide pins 325*b* to be inserted in the second slits 321*b*2 of the seat section 321 are provided on and protruded from the shaft support plate parts 325*a*. Connection holes 325*c* elongated in the longitudinal direction perpendicular to the width direction and engaged with the link member 326 are provided in the shaft support plate parts 325*a*. Further, connection pins 325*d* to be connected to the link member 326 are provided on and protruded from the shaft support plate parts 325*a*.

At the front end part of the disc drive 200 in the lengthwise direction of a shaft support plate part 325*a*, a tongue part 325*a*1 is provided, uniformly protruding downward to the front side of the disc drive 200, with its front end part slidably contacting the inner surface of the guide rail 411. Further, the tongue part 325*a*1 is provided with a long plate spring 420 as a guide member which forms part of the movement regulation section 400 in conjugation with the movement regulation unit 410, on the surface opposed to each other without interference with the disc drive 200. This plate spring 420 has an end which is installed on the bottom end side of the tongue part 325*a*1 such that the other end moves apart from the shaft support plate part 325*a*, and the other end is elastically deformable. That is, the plate spring 420 is provided, inserted together with the tongue part 325*a*1, with one end being slidable on the guide surface 412*b* along the vertical direction as the movement direction in the concave groove of the movement regulation unit 410 of the seat section 321. According to the plate spring 420 thus provided, the plate spring 420 is pressed into contact with the guide surface 412*b* by the biasing force based on elasticity due to the elastic deformation of the plate spring 420 itself. The elastic deformation amount becomes large due to the swelling parts 412*a* of the biasing cam 412 when sliding in the vertical direction, i.e., the plate spring 420 is elastically deformed to be closer to the tongue part 325*a*1, so that the biasing force based on the elasticity increases. Note that the tongue part 325*a*1 normally contacts the inner surface of the guide rail 411. In a state in which the plate spring 420 is pressed in contact with the regulation surface 412*b*1 of the lower swelling part 412*a*, the disc drive 200 is at the home position as the first position shown in FIG. 1A. In another state in which the plate spring 420 is pressed in contact with the regulation surface 412*b*1 of the upper swelling part 412*a*, the disc drive 200 is at the second position shown in FIGS. 1B and 1C. In still another state in which the plate spring 420 is positioned on the slope surfaces 412*b*2 of the swelling parts 412*a*, the movement speed of the disc drive 200 is increasing or decreasing to start or stop moving as the mover unit 300 moves.

On the other hand, the link member 326 of the link mechanism section 323 has a pair of long plate-like first arm parts 326*a*, and a pair of long plate-like second arm parts 326*c* opposed to each other at a predetermined width dimension maintained therebetween by a plate-like link part 326*b*. The first arm parts 326*a* are rotatably supported by the second arm parts 326*c*, at their substantial centers in the lengthwise direction. Ends of the first arm parts 326*a* in the lengthwise direction are rotatably supported by connection pins 325*d* of the shaft support members 325. The other ends thereof are provided with first shaft support pins 326*d* supported slidably by the third slits 321*b*3 of the seat section 321. Ends of the second arm parts 326*c* in the lengthwise direction are rotatably supported by the shaft support pins 321*c* of the seat section 321. The other ends thereof are provided with second shaft support pins 326*e* inserted slidably in the connection holes 325*c* of the shaft support members 325. Further, positioning pins 326*f* slidably inserted in the operation slits 322*e* of the cam section 322 through the first slits 321b1 of the seat section 321 are provided on and projected from the second arm parts 326c.

Further, the cam section 322 of the movable section 320 moves forwards and backwards, relative to the seat section 321, as the electric motor 311 of the drive section 310 drives. As the cam section 322 thus moves, the positioning pins 326f of the link mechanism section 323, which are inserted in the operation slits 322e of the cam section 322, move up and down sliding in the operation slits 322e. The first arm parts 326a and second arm parts 326c of the link mechanism section 323 accordingly rotate, relative to each other, so that the shaft support members 325 attached to the disc drive 200 moves in the vertical direction. As a result, the disc drive 200 moves up and down through the opening 111.

When the disc drive 200 moves and comes near the home position shown in FIGS. 1A and 3A and near the position at which the disc drive 200 protrudes from the opening 111 as shown in FIGS. 1B, 1C, and 3B, the plate spring 420 is elastically deformed greatly by the swelling parts 412a of the movement regulation unit 410, as shown in FIGS. 4A and 4C, so that rattling of the disc drive 200 during upward and downward movements is suppressed by the elastic force of the plate spring 420. Thus, rattling is prevented. When the plate spring 420 slides on the slope surfaces 412b2 of the swelling parts 412a of the movement regulation unit 410, the elastic deformation amount gradually increases or decreases. That is, when the movement speed increases at the beginning of movement, the elastic deformation amount gradually decreases. When the movement speed decreases immediately before the movement ends, the elastic deformation amount gradually increases. The elastic force of the plate spring 420 is thus gradually weakened or strengthened. On the other side, as shown in FIG. 4B, when the plate spring 420 is at an intermediate position where the plate spring 420 contacts the motion surface 412b3 between the swelling parts 412a during movement, the elastic deformation amount of the plate spring 420 decreases to the minimum, the regulation on rattling of the disc drive 200 during upward and downward movement thereof is weakened, so that load during movement is reduced. Further, at the position of the cam section 322 where the disc drive 200 is at the home position shown in FIGS. 1A and 3A, the detection sensor detects this state and outputs a signal indicating of being at the home position. The carrier device of the present invention is constructed by the mover unit 300 and the movement regulation section 400 provided in the mover unit 300.

Figure 6:
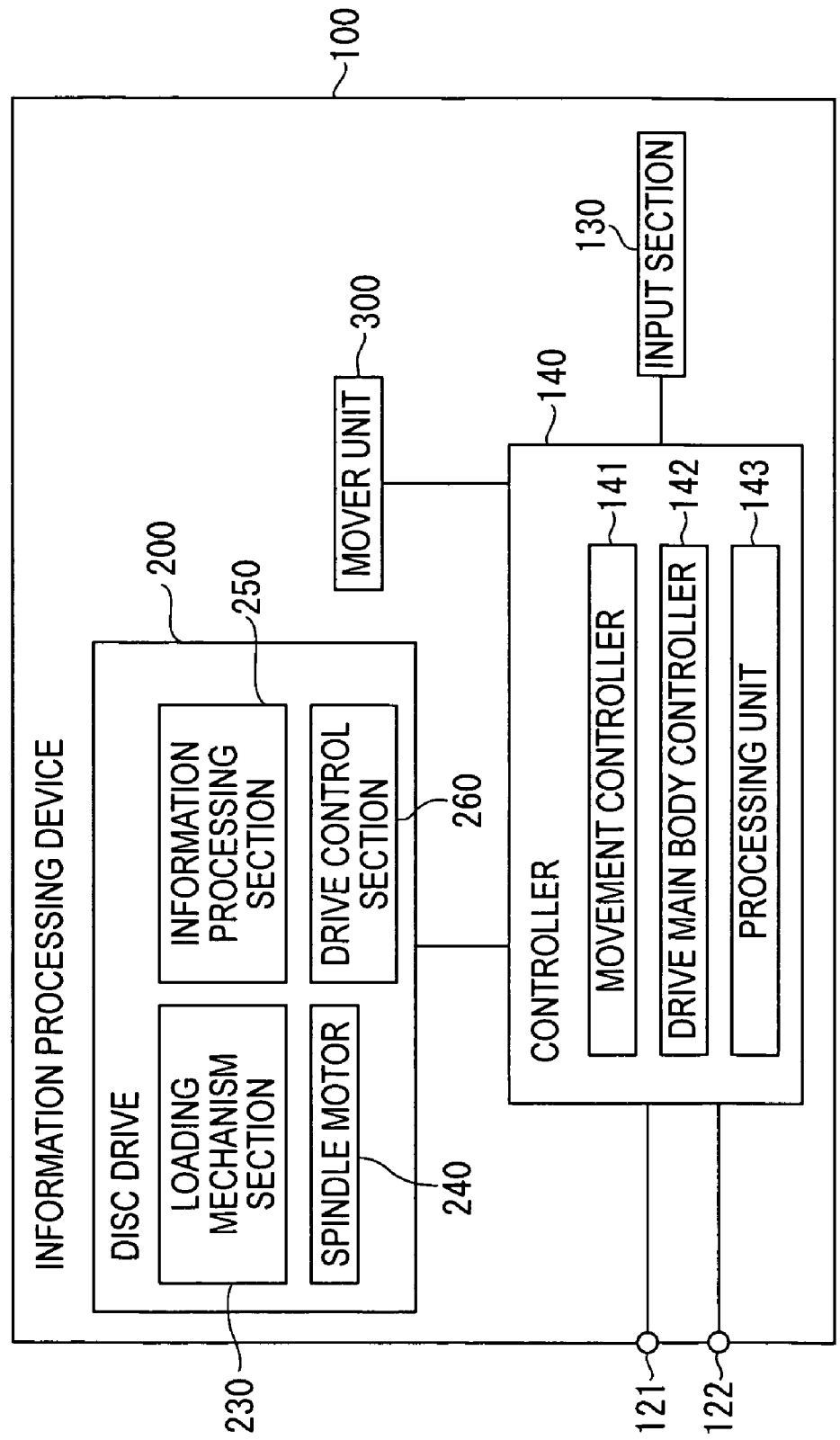
FIG. 6 is a block diagram showing an inner configuration of the information processing device in the embodiment.

Next, the internal structure of the information processing device 100 will be described with reference to FIG. 6. FIG. 6 is a block diagram showing the internal structure of the information processing device 100.

The information processing device 100 has an input terminal 121, an output terminal 122, the disc drive 200, the mover unit 300, an input section 130, and a controller 140 as a computing unit, which are provided in the casing 110. The input terminal 121 is provided, exposed from the outer surface of the casing 110, from which information is input from the outside. The output terminal 122 is provided, also exposed from the outer surface of the casing 110, and outputs information to the outside.

The disc drive 200 has a loading mechanism section 230, a spindle motor 240 as a drive section, an information processing section 250, a drive control section 260, and the like, which are provided in a housing 220. The loading mechanism section 230 moves back and forth the above-described disc tray 210, through an installation opening 221 of the housing 220, under control of the drive control section 260. The carrier section of the present invention is constructed by the loading mechanism section 230 and the disc tray 210 which is moved by the loading mechanism section 230. The spindle motor 240 rotates the loaded optical disc 10 under control of the drive control section 260. The information processing section 250 has a pickup not shown, records information output from the drive control section 260 onto the recording surface of the optical disc 10, and reads and outputs recorded information to the drive control section 260, under control of the drive control section 260. The drive control section 260 controls the loading mechanism section 230, spindle motor 240, and information processing section 250, based on signals from the controller 140, records information output from the controller 140 onto the optical disc 10, and reads and outputs recorded information to the controller 140.

The mover unit 300 has the drive section 310, the movable section 320, the detection sensor, and the like, as has already been described. The drive section 310 works based on signals from the controller 140, and moves the movable section 320 to move up and down the disc drive 200 through the opening 111, i.e., between the state shown in FIG. 1A and the state shown in FIG. 1B. The detection sensor may be a switch which is turned on/off depending on the movement of the movable section 320. The detection sensor detects the home position shown in FIG. 1A in which the disc drive 200 has already been moved back into the opening 111 and housed in the accommodation space and the cover has closed the opening 111. The detection sensor outputs a signal indicating the detection to the controller 140.

The input section 130 has an operation section in which plural operation buttons or knobs not shown are provided to be exposed from the outer surface of the casing 110. The input section 130 outputs predetermined signals to the controller 140 in correspondence with input operations of the operation section, to make the controller 140 set the contents of the input operations. The input section 130 may be constructed to output signals corresponding to input operations, for example, via a wireless medium such as a remote controller.

The controller 140 is constructed, for example, as a circuit mounted on a circuit board not shown. The controller 140 obtains properly signals from the input section 130, controls the whole information processing device 100, and performs various processings. Specifically, the controller 140 obtains and processes various signals and information, properly outputs signals to the disc drive 200 to control the drive control section 260, and thus operates the disc drive 200. The controller 140 also properly outputs signals to the drive section 310 of the mover unit 300 to operate the drive section 310, so that the disc drive 200 is moved up and down through the opening 111. Further, the controller 140 has a movement controller 141, a drive main body controller 142, a processing unit 143, and the like, as programs developed on the OS (Operating System) which controls the whole information processing device 100.

The movement controller 141 properly supplies a current for the drive section 310 of the mover unit 300 to move up and down the disc drive 200. The movement controller 141 can detect the driving state of the drive section 310 by reading the current value flowing through the drive section 310. Also, the movement controller 141 recognizes signals from the detection sensor of the mover unit 300, to determine whether or not the disc drive 200 is at the home position shown in FIG. 1A.

The drive main body controller 142 outputs predetermined signals to the drive control section 260 to make the drive control section 260 control the operation of the disc drive 200. Specifically, the operation of the loading mechanism section 230 which moves forth and back the disc tray 210 of the disc drive 200 is controlled to move forth and back the disc tray 210. Also, the operation of the spindle motor 240 which rotates the optical disc 10 loaded in the disc drive 200 is controlled. Also, the operation of the information processing section 250 having a pickup for recording information on the recording surface of the optical disc 10 and for reading recorded information is controlled to manage processings for recording or reading information. When the drive main body controller 142 recognizes, through the movement controller 141, that the drive section 310 of the mover unit 300 is operating and the disc drive 200 is moving, the drive main body controller 142 performs control for inhibiting the driving of the spindle motor 240, i.e., inhibiting rotation of the optical disc 10. When the drive main body controller 142 recognizes that the movement controller 141 determines the disc drive 200 as not being in the home position shown in FIG. 1A after having moved back in the opening 111 of the casing 110, the drive main body controller 142 regulates the operation of the information processing section 250 of the disc drive 200, i.e., performs control of inhibiting processings for recording or reading information.

The processing unit 143 obtains and properly processes information input to the input terminal 121, and then outputs the information to the disc drive 200 and also obtains and properly processes information output from the disc drive 200 and then outputs the information through the output terminal 122. More specifically, the processing unit 143 obtains video data and image data or audio data and music data, as information input to the input terminal 121, performs properly decoding processings and encoding processings, and then outputs the information to the disc drive 200. The section 143 controls the operation of the disc drive 200 through the drive main body controller 142, to record properly the information in the optical disc 10. Also, the processing unit 143 controls the operation of the disc drive 200 through the drive main body controller 142, to read video data and image data or audio data and music data which are recorded on the disc drive 200. The processing unit 143 thus obtains the read data, performs properly decoding processings and encoding processings, and then outputs the data through the output terminal 122.

[Operation of Information Processor]

Figure 7:
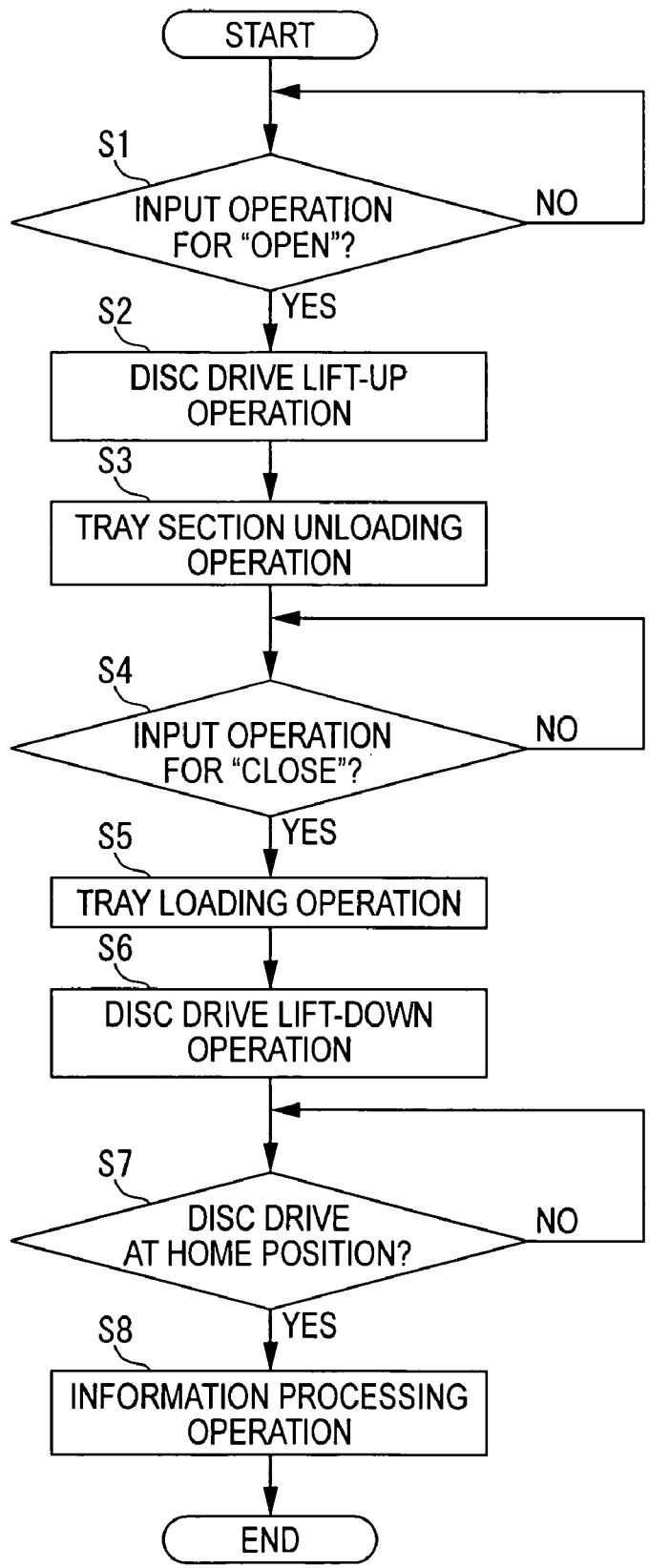
FIG. 7 is a flowchart showing an operation of processing information in the embodiment.

Next, the operation of processing information in the information processing device will be described with reference to FIG. 7. FIG. 7 is a flowchart showing the operation of processing information.

At first, the information processing device 100 is supplied with electric power. The user performs an operation of inputting "open" for moving out the disc tray 210 via the input section 130 of the information processing device 100. The controller 140 then recognizes it based on a signal output from the input section 130 (step S1). As a result, the controller 140 makes the movement controller 141 output a predetermined signal to the drive section 310 of the mover unit 300 to operate the drive section 310, and performs control of moving the disc drive 200 out of the opening 111 by moving the movable section 320 (step S2). That is, the electric motor 311 of the drive section 310 of the mover unit 300 is driven.

When the disc drive 200 moves into the state of being moved up under the control of the step S2, the movement regulation section 400 operates to strengthen regulation on the horizontal movement which is the direction perpendicular to the movement direction, near the home position shown in FIG. 1A and the uppermost position shown in FIG. 1B. That is, the plate spring 420 pressed against a regulation surface 412b1 of the biasing cam 412 moves relatively upwards together with the disc drive 200, relative to the movement regulation unit 410, and slides on a slope surface 412b2 from the regulation surface 412b1 of the biasing cam 412. When this plate spring 420 slides on the slope surface 412b2, the groove width of the guide rail 411 gradually widens, relative to the plate spring 420, so that the elastic deformation amount of the plate spring 420 caused by the biasing cam 412 gradually decreases. As a result, the elastic force of the plate spring 420 weakens gradually so that the pressing force with the guide surface 412b decreases. When the plate spring 420 further slides to the motion surface 412b3 from the slope surface 412b2, the elastic deformation amount is reduced most, as shown in FIG. 4B, so that the pressing force with the guide surface 412b is reduced most. As a result of this, load to movement of the disc drive 200 due to driving of the electric motor 311 decreases so that the disc drive 200 moves excellently. Further, near the uppermost position shown in FIG. 1B where the disc drive 200 has moved out through the opening 111, the plate spring 420 slides from the motion surface 412b3 of the biasing cam 412 to the other upper slope surface 412b2, as shown in FIG. 4C. Then, the pressing force due to the elastic force of the plate spring 420 gradually increases again. The plate spring 420 then shifts into the state where the plate spring 420 runs on the other upper regulation surface 412b1, at the uppermost position shown in FIG. 1B, so that the pressing force increases most.

Then, the movement controller 141 of the controller 140 recognizes that the disc drive 200 moves out of the opening 111 to the uppermost position shown in FIG. 1B, for example, a predetermined load is applied to the electric motor 311 of the drive section 310 because of the movable section 320 being unable to move any more, and the current value for driving the electric motor 311 reaches a predetermined value or higher. Upon this recognition, the movement controller 141 determines that the disc drive 200 has been moved up, and stops the control of operating the drive section 310, i.e., stops supply of the current to the drive section 310. Thereafter, the drive main body controller 142 of the controller 140 outputs a predetermined signal to the drive control section 260 of the disc drive 200, and operates the loading mechanism section 230 via the drive control section 260, to perform control of unloading the disc tray 210 (step S3).

In a state that the disc tray 210 is unloaded as shown in FIG. 1C, the user sets an optical disc 10 on the disc tray 210, and inputs "close" for moving back the disc tray 210 by the input section 130. The controller 140 then recognizes the input operation upon a signal output from the input section 130 (step S4). As a result, the drive main body controller 142 of the controller 140 outputs a predetermined signal to the drive control section 260 of the disc drive 200, and makes the drive control section 260 operate the loading mechanism section 230, to perform control of moving back the disc tray 210 (step S5). Thereafter, the controller 140 recognizes a signal from the drive control section 260, indicating that the disc tray 210 has been moved back and the loading mechanism section 230 has completed the operation of loading the optical disc 10. Then, the controller 140 outputs a predetermined signal to the drive section 310 of the mover unit 300, to operate the drive section 310, and makes the movable section 320 operate to perform control of moving back the disc drive 200 through the opening 111 into the accommodation space (step S6). During movement of the disc drive 200 in the step S6, the same operation as the movement regulation operation of the disc drive 200 performed by the movement regulation section 400 in the step S2 is performed. Further, the controller 140 stops the control of operating the drive section 310 when a signal indicating the home position shown in FIG. 1A in which the disc drive 200 is housed is output from the detection sensor of the mover unit 300.

As the controller 140 recognizes the signal from the detection sensor of the mover unit 300 (step S7), a predetermined signal is output from the drive main body controller 142 to the drive control section 260, to perform control of executing preprocessings for recording information on the optical disc 10 and obtaining recorded information, in the disc drive 200. Specifically, the spindle motor 240 is rotated and the pickup is moved along the recording surface of the optical disc 10, to execute focus control, tracking control, determination as to presence or absence of the optical disc 10, and determination as to the type of the optical disc 10. Thereafter, recording and reading of information are carried out, based on the contents of the input operation via the input section 130 (step S8).

[Operation and Advantages of Information Processing Device]

As described above, in the present embodiment, the disc drive 200 is integrally provided with the plate spring 420 which is pressed into contact with the guide surface 412b along the motion path of the disc drive 200 by elastic biasing force when the disc drive 200 is moved between the home position shown in FIG. 1A and the uppermost position shown in FIG. 1B by the mover unit 300. In the states in which the disc drive 200 is positioned near the home position shown in FIG. 1A and the uppermost position shown in FIG. 1B, the biasing force of the plate spring 420 is increased. Therefore, when the disc drive 200 is positioned at the home position shown in FIG. 1A or the uppermost position shown in FIG. 1B, the plate spring 420 is pressed into strong contact with the guide surface 412b, so that regulation on movement of the disc drive 200 is strengthened in the leftward and rightward directions. Accordingly, the disc drive 200 under operation is prevented from moving due to, for example, an external impact when the disc drive 200 is at the home position shown in FIG. 1A or at the uppermost position shown in FIG. 1B. As a result, the optical disc 10 which is driven and rotated by the spindle motor 240 is prevented from contacting the disc tray 210, the pickup, or the like while moving and from damaging thereby the optical disc 10 itself, the pickup, or the like. In addition, the disc tray 210 is prevented from contacting other parts while moving and from causing thereby damages. In contrast, while the disc drive 200 is moving, the biasing force of the plate spring 420 weakens. By thus actively producing a state in which the biasing force weakens, the pressing force of the plate spring 420 decreases. Load to the electric motor 311 for moving the disc drive 200 not operating, can therefore be reduced, so that the electric motor 311 can be downsized and increase in power consumption of the electric motor 311 can be prevented easily.

The increase of the biasing force of the plate spring 420 is arranged such that the elastic deformation amount of the plate spring 420 increases in the states in which the disc drive 200 is at the home position shown in FIG. 1A and the uppermost position shown in FIG. 1B. Therefore, the biasing force of the plate spring 420 can be increased with a simple structure, so that the structure can be simplified easily.

As a structure which results in a larger elastic deformation amount, the swelling parts 412a are provided such that the guide surface 412b swells in the pressing direction to contact the plate spring 420 in the states in which the disc drive 200 is at the home position shown in FIG. 1A and the uppermost position shown in FIG. 1B. Therefore, the elastic deformation amount of the plate spring 420 can be increased with a simple structure, so that the biasing force can be increased. Thus, the productivity can be improved and costs for the device can be reduced with ease.

The elastic plate spring 420 is used as a structure of making pressed contact with the guide surface 412b. Therefore, there is no need of separately providing any biasing unit that biases the plate spring 420 in the direction in which the plate spring 420 is pressed into contact with the guide surface 412b. Thus, the plate spring 420 itself functions also as a biasing unit, so that the structure can be simplified easily. Accordingly, the productivity can be improved and costs for the device can be reduced with ease.

Further, the guide rail 411 is integrally provided with the biasing cam 412 which has swelling parts 412a at both ends in the lengthwise direction, to form part of the movement regulation unit 410 having the guide surface 412b with which the plate spring 420 is pressed into contact. It is therefore possible to simplify the structure in which the pressing force to the guide surface 412b increases in the states in which the disc drive 200 is at the home position shown in FIG. 1A and the uppermost position shown in FIG. 1B. Hence, the productivity can be improved and costs for the device can be reduced with ease. Setting of the biasing force based on the elasticity of the plate spring 420 can be easily achieved, resulting in improvements in versatility.

The slope surfaces 412b2 are further formed on the guide surface 412b. Therefore, the plate spring 420 slides smoothly between the regulation surfaces 412b1 on which the pressing force strengthens when movement starts or stops and the motion surface 412b3 on which the pressing force weakens in the middle of movement. An excellent movement regulation structure can hence be achieved. Further, in the state in which the slope surfaces 412b2 continuously change the pressing force, the increase and decrease of the pressing force can be made easily corresponding to the increase and decrease of the movement speed at the beginning of movement or immediately before a stop of movement. As a result, changes in the load to the electric motor 311 can be reduced, so that excellent movement is achieved. Accordingly, the electric motor 311 can be downsized easily, and increase of the power consumption can be prevented easily.

Further, the tongue part 325a1 inserted in the concave groove of the movement regulation unit 410 is provided. Therefore, even when a strong impact is applied from outside, the tongue part 325a1 contacts the inner surface of the concave groove, thereby preventing the disc drive 200 from moving any more. Respective parts of the disc drive 200 and the mover unit 300 can hence be prevented from being damaged. Further, since the plate spring 420 is attached to the tongue part 325a1, the plate spring 420 can be provided without interfering with the disc drive 200, so that the productivity can be improved.

Modifications of Embodiment

The present invention is not limited to the embodiment described above but may include further modifications as described below within the scope in which the objects of the present invention can be achieved.

That is, the information processing device 100 of the present invention is not limited to the structure as described above which deals with the optical disc 10. The information processing device 100, however, may deal with any disc-like recording medium capable of optically or magnetically reproducing or recording information, such as a magnetic disc, magneto-optical disc, or the like. Further, it is possible to deal with any other recording medium that can record information readably, e.g., a memory card, magnetic tape, or the like.

The processing device according to the present invention is applicable even to, for example, a disc drive having a loading mechanism section which does not use the disc tray 210, a disc drive which deals with a kind of medium having a case in which the optical disc 10 is contained rotatably, like a MD (Mini Disc). It is thus possible to use any structure as long as information can be recorded on or read from a recording medium by the information processing section 250 which is moved relative to the recording medium by a driving section. Further, not only a structure capable of both processings of recording and reading information but also a structure capable of only reading information, like a player, or capable of only recording information may also be applicable. In the foregoing description, the spindle motor 240 which rotates the optical disc 10 has been exemplified as a driving section. The present invention, however, is not limited thereto but any structure can be used. Further, it is possible to adopt not only a structure in which a recording medium is rotated or moved but also another structure in which the information processing section 250 for recording information or reading recorded information is moved relatively or in which both of the recording medium and the information processing section are relatively moved. Furthermore, the target to be moved is not limited to a processing device but may be any object like an elevator. Specifically, the movement adjusting device according to the present invention is applicable to any structure in which a mobile body to be moved moves between first and second positions.

The mover unit 300 is not limited to the structure as described above but may adopt any structure in which a drive main body is moved in and out through the opening 111 of the casing 110. It is possible to adopt not only the structure in which the disc drive 200 is lifted up and down but also a structure in which the disc drive 200 is moved in the same directions as the disc tray 210 is moved. Thus, the disc drive 200 can be moved in any form or state and further may be moved plural times in different directions.

Figure 8:
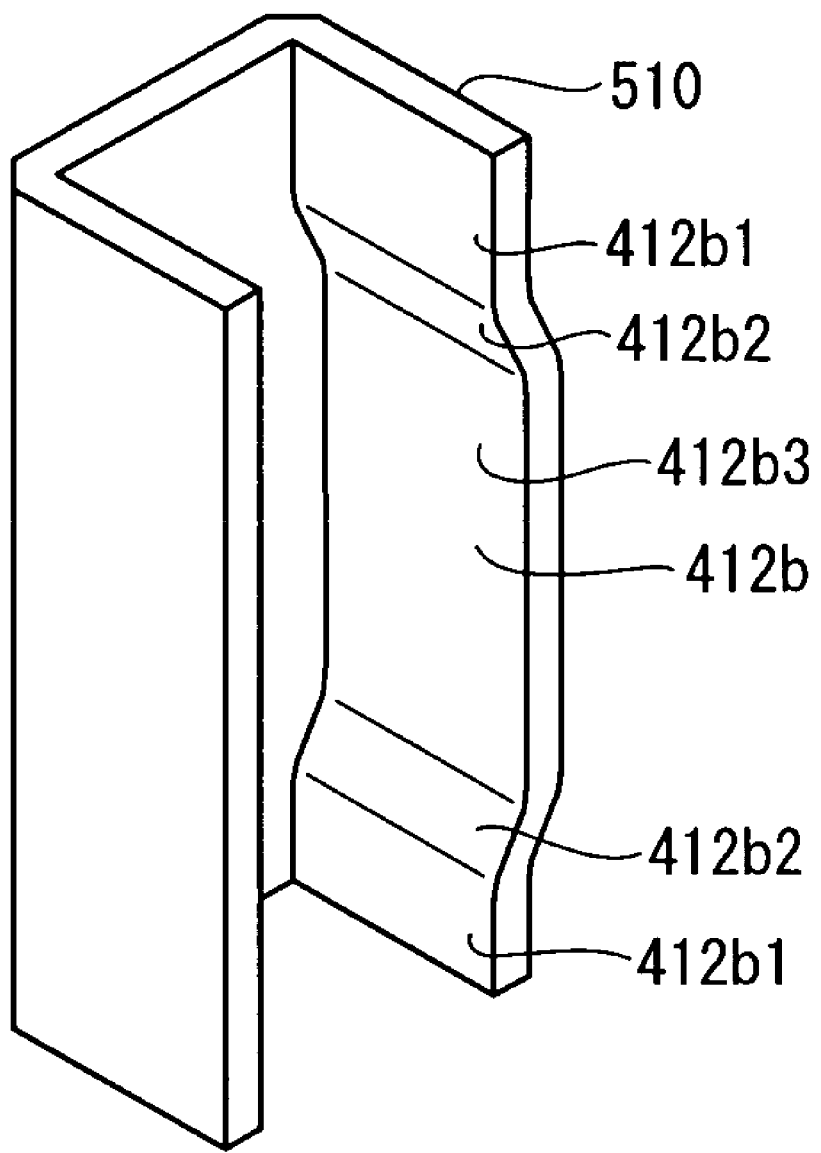
FIG. 8 is a perspective view showing a movement regulation unit of a movement regulation section in another embodiment of the present invention.

Meanwhile, it has been described that the biasing cam 412 having the swelling parts 412a in both ends in the lengthwise direction on the guide rail 411 having a U-shaped cross-section is integrally provided, and the guide surface 412b is constructed to form part of the surface of the guide rail 411 in the groove width direction. However, as has been described previously, it is possible to use a movement regulation unit 510 having an integral structure in which one side surface of the guide rail 411 is formed and bent, corresponding to the surface of the biasing cam 412, and the guide surface 412b is provided as an inner surface thereof, for example, as shown in FIG. 8. According to the structure shown in FIG. 8, the structure can be constructed by only one member. For example, the member can be processed through only one procedure of pressing a steel plate, so that the productivity can be improved and costs can be reduced easily.

Figure 9:
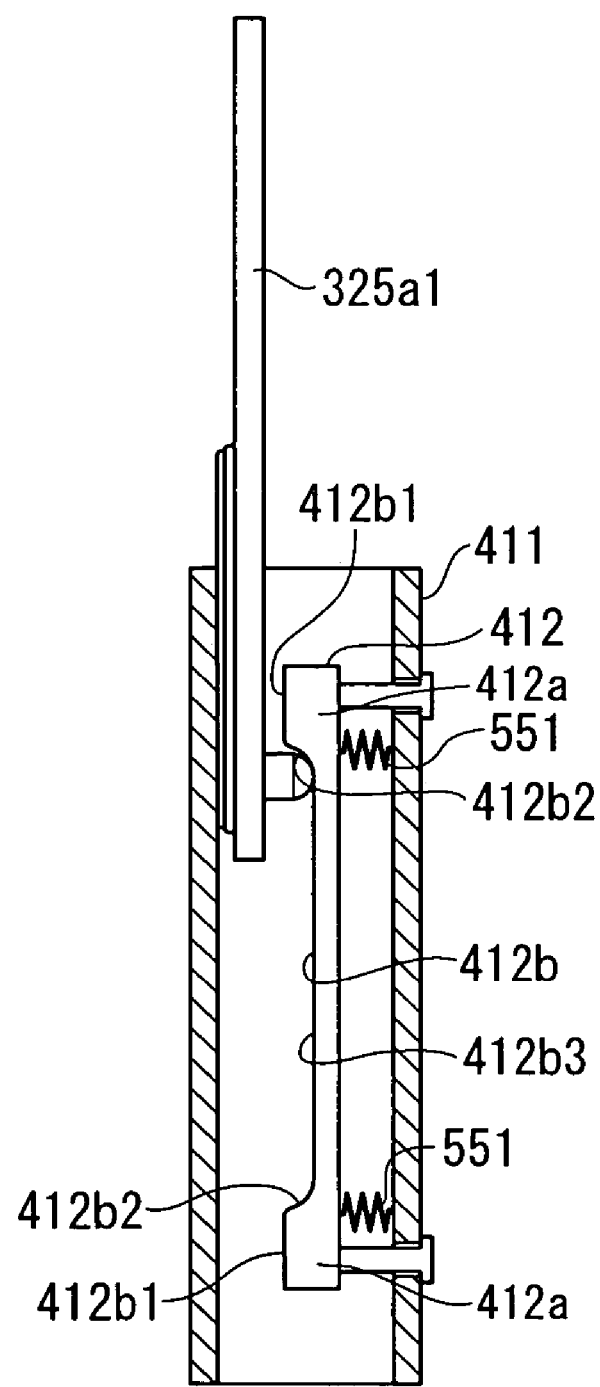
FIG. 9 is a side view showing a movement regulation section in still another embodiment of the present invention with a portion cut away therefrom.

It has also been described that the plate spring 420 having elasticity is pressed into contact with the guide surface 412b. However, as shown in FIG. 9, the plate spring 420 may be omitted but the tongue part 325a1 may be used as a guide member. Instead, for example, a coil spring 551 as a biasing unit, which biases the biasing cam 412 in the direction of moving apart from one side of the guide rail 411 and which presses the tongue part 325a1 inserted in the concave groove of the guide rail 411 against the guide surface 412b, may be provided between the guide rail 411 and the biasing cam 412 attached on one side surface of the guide rail 411. In the structure shown in FIG. 9, in a state in which the tongue part 325a1 contacts the regulation surface 412b1, the biasing cam 412 is pressed against the guide rail 411, reacting against the elasticity of the coil spring 551, so that the elastic deformation amount of the coil spring 551 is increased to be greater by the swelling part 412a than in another state in which the tongue part 325a1 contacts the motion surface 412b3. Therefore, like the above-described embodiment, it is possible to attain a structure in which the pressing force to the guide surface 412b increases in the states in which the disc drive 200 is at the home position shown in FIG. 1A and the uppermost position shown in FIG. 1B. Mobility based on the mover unit 300 of the disc drive 200 and movement regulation during operation can thus be achieved with ease. Note that the plate spring 420 may contact the guide surface 412b having this structure, and the pressing force may be increased/decreased by the biasing force of the elasticity of both.

Figure 10:
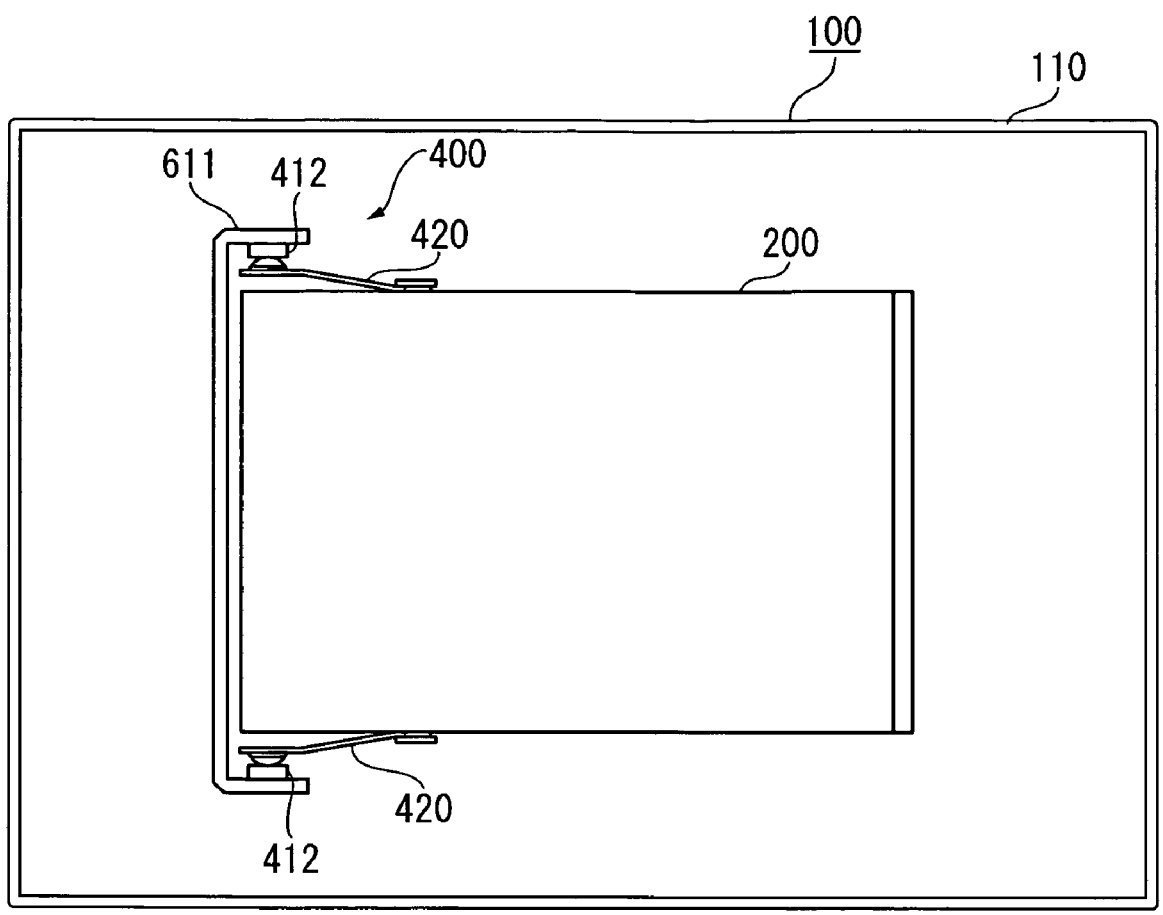
FIG. 10 is a conceptual view showing a movement regulation section in yet another embodiment of the present invention.
Figure 11A:
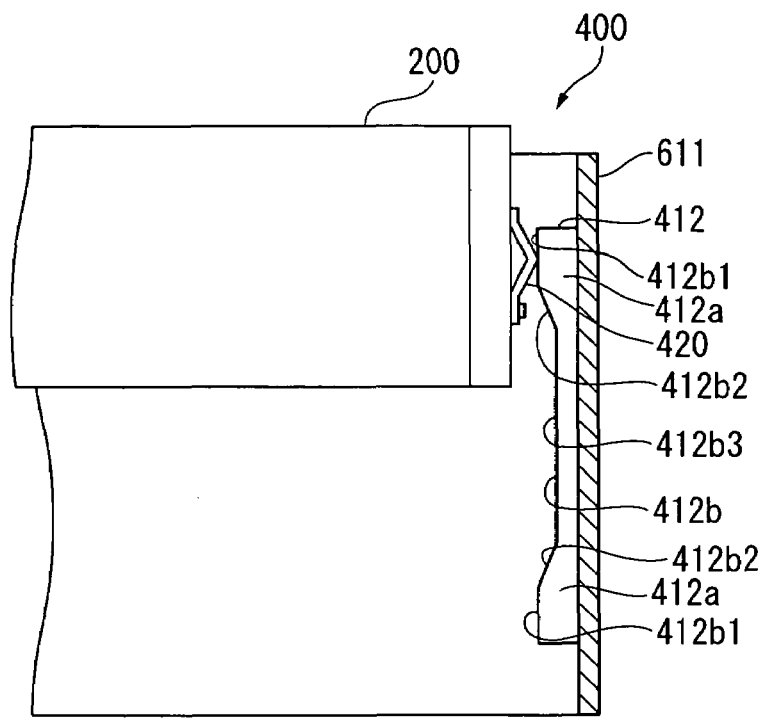
FIGS. 11A and 11B are conceptual views showing a movement regulation section in further embodiment of the present invention, where
Figure 11B:
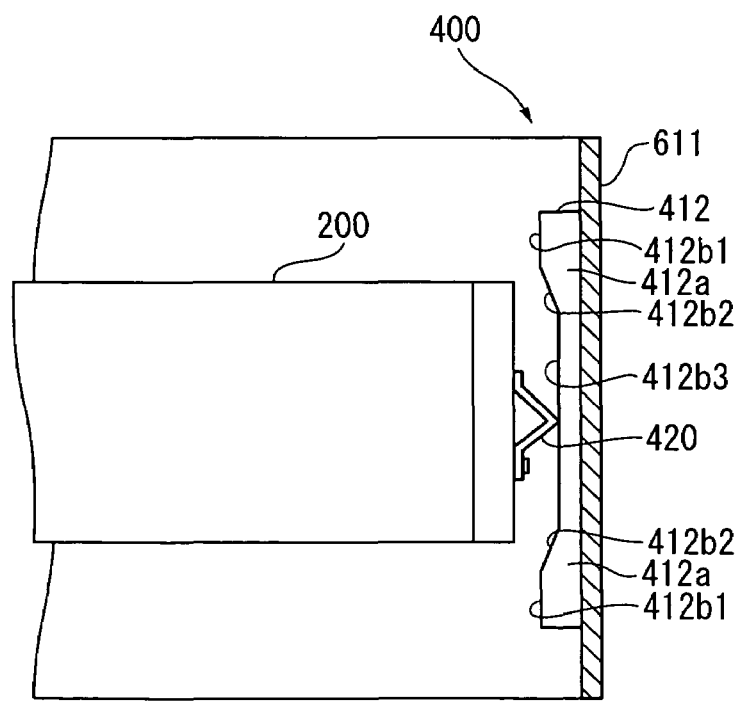

Further, it has been described that the plate spring 420 is attached to the shaft support plate part 325a for attaching the mover unit 300 to the disc drive 200. However, the structure may be arranged such that, for example, the disc drive 200 directly regulates the movement. For example, as shown in FIG. 10, a guide rail 611 having a concave groove in the vertical direction may be provided at a position corresponding to the rear part of the disc drive 200, and the biasing cam 412 may be provided on a surface of the guide rail 611 which corresponds to a side surface of the disc drive 200. Meanwhile, a plate spring 420 bent to have an L-shaped cross-section is attached at a position of the disc drive 200 corresponding to the biasing cam 412, and is arranged such that the bent top end contacts and slides on the guide surface 412b. In this state of contact, the plate spring 420 is elastically deformed, pressing the top end to contact the guide surface. In this structure, the tongue part 325a1 is arranged so as not to interfere with the disc drive 200, and therefore, it is needless to provide the plate spring 420. Downsizing can hence be easily achieved. Note that the plate spring 420 in the embodiment shown in FIG. 10 may be formed and bent such that the side surface is L-shaped as shown in FIGS. 11A and 11B.

Figure 12A:
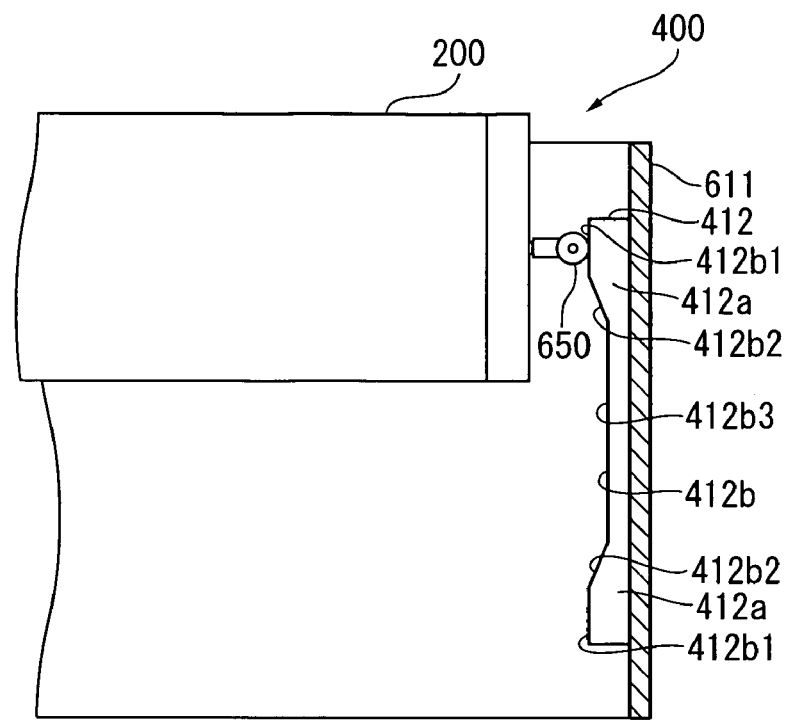
FIGS. 12A and 12B are conceptual views showing a movement regulation section in still further embodiment of the present invention, where
Figure 12B:
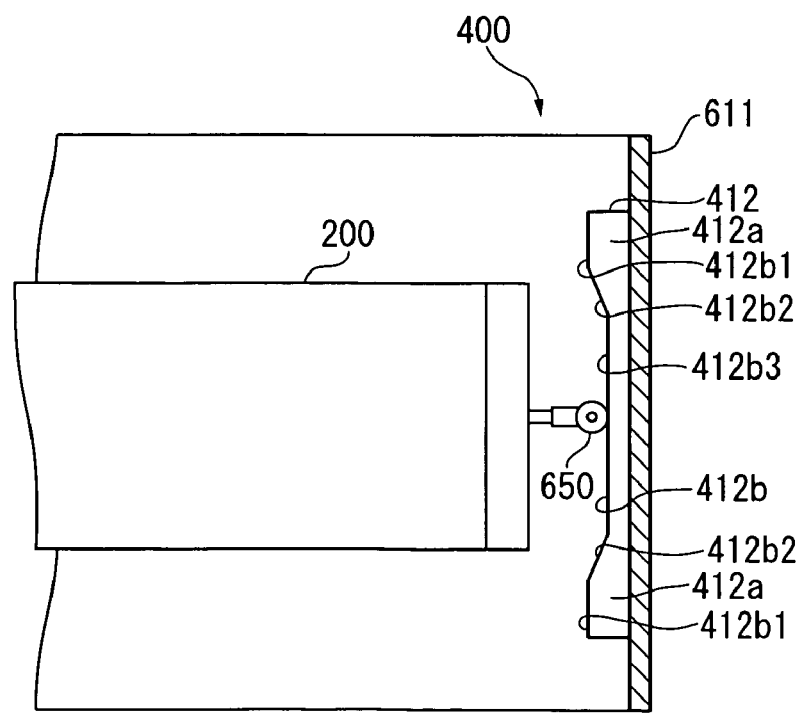

Furthermore, in place of the plate spring 420 in the embodiment shown in FIG. 10, it is possible to adopt such a structure in which a wheel 650 provided at the top end and biased in the direction of moving apart from the side surface of the disc drive 200 by an biasing unit such as a coil spring not shown is pressed into contact with the guide surface 412b, for example, as shown in FIGS. 12A and 12B. According to the structure as shown in FIGS. 12A and 12B, the disc drive 200 can be smoothly moved by rotation of the wheel 650.

The description has also been made with respect to the guide surface 412b having regulation surfaces 412b1 at both ends in the lengthwise direction. However, only one regulation surface may be provided at one end or three or more regulation surfaces may be provided. Further, the form of the structure may be arranged appropriately in consistence with the timing at which movement of the mobile body to be moved is regulated, e.g., the regulation surfaces may be provided at intermediate positions or a curved surface may be applied. Furthermore, a cylinder or the like may be used as a biasing unit with the guide surface 412b kept flat. The cylinder may be driven at the timing of regulating the movement of the mobile body, so that the guide surface 412b is to be pressed against a guide member such as the plate spring 420 or tongue part 325a1. Alternatively, the guide member is to be pressed against the guide surface 412b. As another structure of the movement regulation section 400 which regulates the movement of the disc drive 200, any structure may be used as long as the pressing force to the guide surface 412b is increased at the home position shown in FIG. 1A and at the uppermost position shown in FIG. 1B.

Also, it has been described that the processing unit 143 for processing information, the drive main body controller 142 for controlling the operation of the disc drive 200, and the movement controller 141 for controlling the operation of the mover unit 300 are constituted as programs in the controller 140. However, these sections are not limited to programs but may be hardware such as circuit boards or the like or may be constructed as an element of one IC (Integrated Circuit), for example. Thus, any forms are applicable. Note that, if the sections are constructed in the form of programs or read from a separate recording medium, easy handling is achieved so that use of the invention prevails.

Further, the spindle motor 240 is rendered operational after housing the disc tray 210 and the disc drive 200. However, as described above, the spindle motor 240 may be driven once to hold steadily the optical disc 10 after the disc tray 210 is housed, and then, the disc drive 200 may be housed to execute processings of recording information and reading recorded information. That is, while the disc drive 200 is moving, the spindle motor 240 is not driven. Only when the disc drive 200 is housed, the processings of recording and reading information may be executed.

Furthermore, specific structures and procedures in practicing the present invention may appropriately be changed into other ones within the scope in which the objects of the present invention are achieved.

Advantages of Embodiment

As described above, in the above embodiment, there are integrally provided the plate spring 420 and the wheel 650 which are elastically pressed into contact with the guide surface 412*b* along the motion path of the disc drive 200 when the disc drive 200 is moved between the home position shown in FIG. 1A and the uppermost position shown in FIG. 1B. In the states in which the disc drive 200 is positioned near the home position shown in FIG. 1A and the uppermost position shown in FIG. 1B, the biasing force of the plate spring 420 or the coil spring not shown is increased. Therefore, in the states in which the disc drive 200 is at the home position shown in FIG. 1A and the uppermost position shown in FIG. 1B, the plate spring 420 and the wheel 650 are pressed into strong contact with the guide surface 412*b*, so that regulation on movement of the disc drive 200 is strengthened. In contrast, when the disc drive 200 is moving, the force biasing the plate spring 420 and the wheel 650 is weakened, so that the disc drive 200 can be prevented from being moved due to impact from the outside while the disc drive 200 is operating. Problems of damages can hence be prevented, and load to the electric motor 311 to move the disc drive 200 by the mover unit 300 can be reduced.

Further, in the above embodiment, when the disc drive 200 is moved between the home position shown in FIG. 1A and the uppermost position shown in FIG. 1B by the mover unit 300, the tongue part 325*a*1 and the wheel 650 as guide members provided integrally in the disc drive 200 contact the guide surface 412*b* extending along the motion path of the disc drive 200. In the states in which the disc drive 200 is positioned near the home position shown in FIG. 1A and the uppermost position shown in FIG. 1B, the biasing force of the coil spring 551 or the like in the pressing direction is increased. Therefore, in the states in which the disc drive 200 is at the home position shown in FIG. 1A and the uppermost position shown in FIG. 1B, the tongue part 325*a*1 and the wheel 650 are pressed into strong contact with the guide surface 412*b*, so that regulation on movement of the disc drive 200 is strengthened. In contrast, when the disc drive 200 is moving, the force biasing the tongue part 325*a*1 and the wheel 650 is weakened, so that the disc drive 200 can be prevented from being moved due to impact from outside while the disc drive 200 is operating. Problems of damages can hence be prevented, and load to the electric motor 311 to move the disc drive 200 by the mover unit 300 can be reduced.

Further, in the above embodiment, when the disc drive 200 is moved between the home position shown in FIG. 1A and the uppermost position shown in FIG. 1B by the mover unit 300, the tongue part 325*a*1 and the wheel 650 as guide members provided integrally in the disc drive 200 contact the guide surface 412*b* extending along the motion path of the disc drive 200. In the states in which the disc drive 200 is positioned near the home position shown in FIG. 1A and the uppermost position shown in FIG. 1B, the distance over which pressing is made by a biasing unit such as the coil spring 551 or the like is shortened. Therefore, in the states in which the disc drive 200 is at the home position shown in FIG. 1A and the uppermost position shown in FIG. 1B, the tongue part 325*a*1 and the wheel 650 are pressed into strong contact with the guide surface 412*b*, so that regulation on movement of the disc drive 200 is strengthened. In contrast, when the disc drive 200 is moving, the force biasing the tongue part 325*a*1 and the wheel 650 is weakened, so that the disc drive 200 can be prevented from being moved due to impact from the outside while the disc drive 200 is operating. Problems of damages can hence be prevented, and load to the electric motor 311 to move the disc drive 200 by the mover unit 300 can be reduced.

Also, in the above embodiment, when the disc drive 200 is moved between the home position shown in FIG. 1A and the uppermost position shown in FIG. 1B by the mover unit 300, guide members such as the plate spring 420, tongue part 325*a*1, and wheel 650 provided integrally in the disc drive 200 are pressed into contact with the guide surface 412*b* extending along the motion path of the disc drive 200. The guide surface 412*b* is arranged such that this surface swells in the pressing direction, in the states in which the disc drive 200 is positioned near the home position shown in FIG. 1A and the uppermost position shown in FIG. 1B. Therefore, in the states in which the disc drive 200 is at the home position shown in FIG. 1A and the uppermost position shown in FIG. 1B, the guide members are pressed into strong contact with the guide surface 412*b*, so that regulation on movement of the disc drive 200 is strengthened. In contrast, when the disc drive 200 is moving, the pressing force of the guide members is weakened, so that the disc drive 200 can be prevented from being moved due to impact from outside while the disc drive 200 is operating. Problems of damages can hence be prevented, and load to the electric motor 311 to move the disc drive 200 by the mover unit 300 can be reduced.

The priority application Number JP2004-042681 upon which this patent application is based is hereby incorporated by reference.

What is claimed is:

1. A movement adjusting device for adjusting movement of a disc drive which is movable by a mover unit between a first position at which a disc-shaped recording medium is attachable and detachable and a second position at which the disc-shaped recording medium is processed, the movement adjusting device comprising:

a guide surface extending along a motion path of the disc drive;

a guide member which is provided on the disc drive and contacts the guide surface;

a biasing unit which biases the guide member in a direction in which the guide member is pressed toward the guide surface; and a variable unit which increases a biasing force of the biasing unit when the disc drive is near the first and second positions;

wherein the biasing unit includes an elastic member which is elastically deformable; and the variable unit increases the biasing force by increasing the elastic deformation of the biasing unit when the disc drive is near the first and second positions, whereby the biasing force is weakened by decreasing the elastic deformation of the biasing unit while moving the disc drive between the first position and the second position.

2. The movement adjusting device according to claim 1, wherein the variable unit shortens a distance between the guide surface and the guide member in a pressing direction thereof, when the disc drive is near the first and second position positions.

3. The movement adjusting device according to claim 2, wherein the variable unit is so provided that the guide surface is swollen in a pressing direction thereof to contact the guide member, when the disc drive is near the first and second positions.

4. The movement adjusting device according to claim 1, wherein the variable unit executes at least either reduction of the biasing force in accordance with increase in speed of movement of the disc drive by the mover unit or increase of the biasing force in accordance with decrease in speed of the disc drive by the mover unit.

5. The movement adjusting device according to claim 1, wherein the variable unit is so provided that the guide surface being in contact with the guide member is inclined toward the pressing direction thereof, corresponding to a period in which the speed of movement of the disc drive increases.

6. The movement adjusting device according to claim 1, wherein the disc drive is a processing device which executes at least one of operations of reading information recorded on a recording medium and recording information on the recording medium at the first and second positions.

7. The movement adjusting device according to claim 1, wherein the disc drive comprises a disc tray accepting the disc-shaped recording medium and the disc tray is movable in and out of the disc drive.

8. The movement adjusting device according to claim 7, wherein the disc tray is movable in a radial direction of the optical disc, and the mover unit moves the disc drive in a thickness direction of the optical disc.

9. A carrier device, comprising:

a mover unit which moves a disc drive between first position at which a disc-shaped recording medium is attachable and detachable and a second position at which the disc-shaped recording medium is processed; and a movement adjusting device for adjusting movement of the disc drive, the movement adjusting device having:

a guide surface extending along a motion path of the disc drive;

a guide member which is provided on the disc drive and contacts the guide surface;

a biasing unit which biases the guide member in a direction in which the guide member is pressed toward the guide surface; and a variable unit which increases a biasing force of the biasing unit when the disc drive is near the first and second positions;

wherein the biasing unit includes an elastic member which is elastically deformable; and the variable unit increases the biasing force by increasing the elastic deformation of the biasing unit when the disc drive is near the first and second positions, whereby the biasing force is weakened by decreasing the elastic deformation of the biasing unit while moving the disc drive between the first position and the second position.

10. The movement adjusting device according to claim 9, wherein the disc drive comprises a disc tray accepting the disc-shaped recording medium and the disc tray is movable in and out of the disc drive.

11. The movement adjusting device according to claim 10, wherein the disc tray is movable in a radial direction of the optical disc, and the mover unit moves the disc drive in a thickness direction of the optical disc.

12. A movement adjusting method of adjusting movement of a disc drive which is movable between a first position at which a disc-shaped recording medium is attachable and detachable and a second position at which the disc-shaped recording medium is processed by a mover unit, the method comprising:

pressing a guide member provided on the disc drive to contact a guide surface extending along a motion path of the disc drive with a biasing force; and increasing the biasing force by increasing the elastic deformation of a biasing unit when the disc drive is near the first and second positions, whereby the biasing force is weakened by decreasing the elastic deformation of the biasing unit while moving the disc drive between the first position and the second position.

13. The movement adjusting method according to claim 12, wherein the disc-shaped recording medium is attachable and detachable in a direction different from a direction of the motion between the first position and the second position.

* * * * *